United States Patent
Kassam et al.

(10) Patent No.: US 8,706,726 B2
(45) Date of Patent: Apr. 22, 2014

(54) METHOD AND SYSTEM FOR MONITORING AND ANALYZING TICKETS

(75) Inventors: Shafiq Kassam, Lewisville, TX (US); Sudarshan Selvakumar, Irving, TX (US); Venket Kandanala, Highland Village, TX (US); Vadivel Mohanakrishnan, Chennai (IN); Fazil C. Ummer, Kerala (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 505 days.

(21) Appl. No.: 12/338,075

(22) Filed: Dec. 18, 2008

(65) Prior Publication Data
US 2010/0161673 A1 Jun. 24, 2010

(51) Int. Cl.
*G06F 7/00* (2006.01)
*G06F 17/30* (2006.01)

(52) U.S. Cl.
USPC ..... 707/736; 707/722; 707/802; 707/999.003

(58) Field of Classification Search
None
See application file for complete search history.

(56) References Cited

U.S. PATENT DOCUMENTS

| | | | |
|---|---|---|---|
| 7,929,686 B2 * | 4/2011 | Bienfait et al. | 379/265.02 |
| 2003/0110248 A1 * | 6/2003 | Ritche | 709/224 |
| 2004/0138910 A1 * | 7/2004 | Matsuno et al. | 705/1 |
| 2006/0245579 A1 * | 11/2006 | Bienfait et al. | 379/265.02 |
| 2007/0078863 A1 * | 4/2007 | Thompson | 707/100 |
| 2007/0116185 A1 * | 5/2007 | Savoor et al. | 379/9 |
| 2007/0299953 A1 * | 12/2007 | Walker et al. | 709/223 |
| 2008/0155564 A1 * | 6/2008 | Shcherbina et al. | 719/318 |
| 2008/0200231 A1 * | 8/2008 | Wright | 463/17 |

* cited by examiner

*Primary Examiner* — Azam Cheema

(57) ABSTRACT

Exemplary embodiments include methods and systems for monitoring and analyzing tickets including collecting data associated with one or more parameters/keywords of tickets. The methods and systems may also include determining if a number of tickets associated the one or more parameters/keywords exceeds a count threshold associated with the one or more parameters. The methods and systems may further include outputting a result of the analysis of the collected data.

23 Claims, 4 Drawing Sheets

METHOD AND SYSTEM FOR MONITORING AND ANALYZING TICKETS

BACKGROUND

Monitoring and/or analyzing tickets are a growing concern for service providers, for example, television service providers, Internet service providers (ISPs), and telephone service providers, as these services continue to grow. Reducing downtime and/or avoiding issues associated with television/Internet/telephone services are an increasing concern to these service providers. For example, a service provider may receive a large amount of tickets in a time period (e.g., approximately 500,000/month) reporting issues associated with the television/Internet/telephone services. Conventional monitoring and/or analyzing of tickets may typically require service providers to manually access each ticket to collect information associated with the ticket, thus this process may be tedious and time consuming. Also, conventional monitoring and/or analyzing tickets may require a manual analysis of the collected information in order to identify one or more issues and may be error prone because of a lack of standardized monitoring and/or analysis methodologies. Moreover, conventional monitoring and/or analyzing tickets may rely on ticket reviewers to alert a service administrator or manager of issues associated with a service. As a result, the service administrator or manager may miss an alert.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

Figure 1:
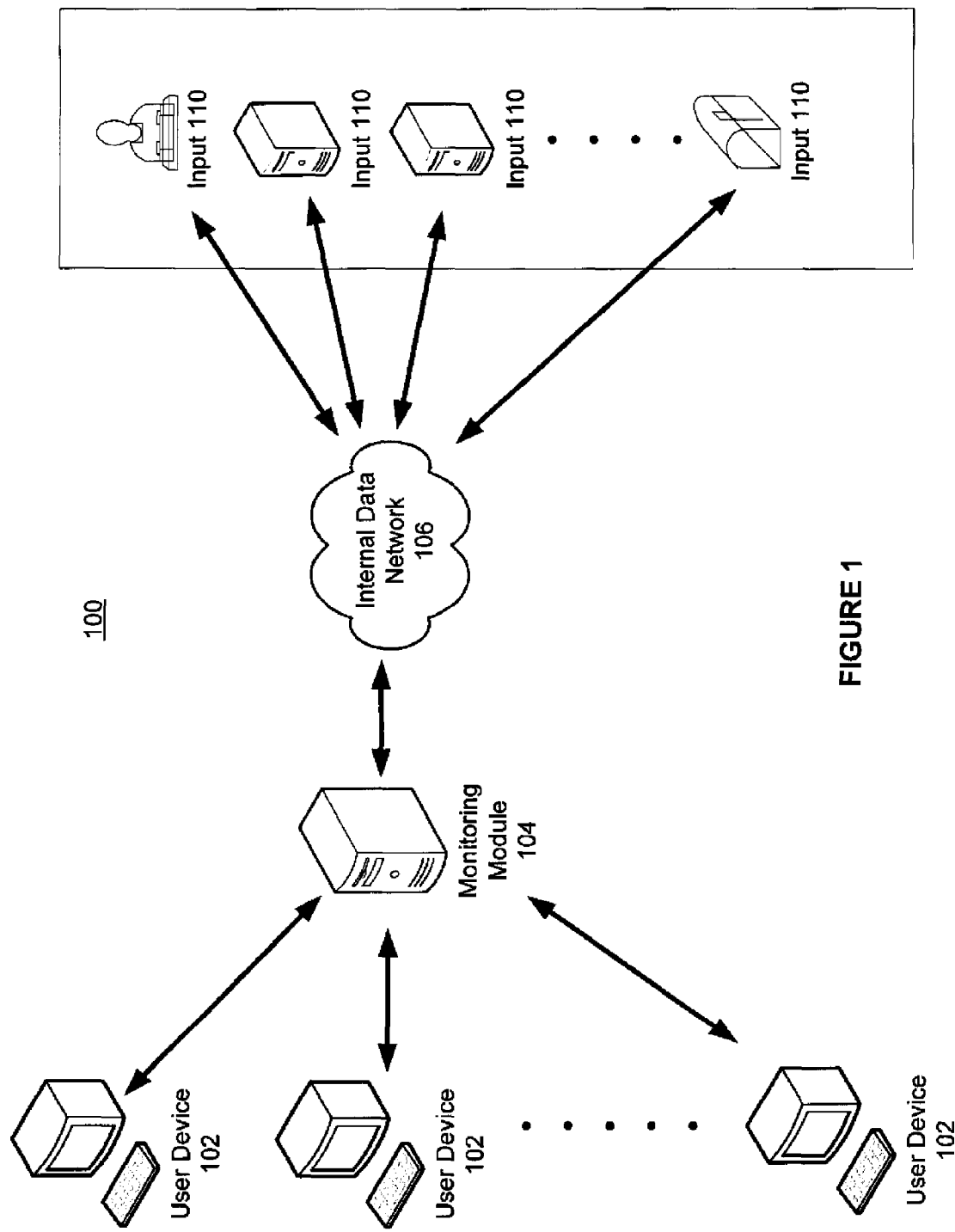
FIG. 1 illustrates a block diagram of a system for monitoring and/or analyzing one or more tickets in accordance with an exemplary embodiment.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

A system and method in accordance with exemplary embodiments may include collecting data from tickets, storing the data, and/or analyzing the data. In another exemplary embodiment, the system and method may identify one or more keywords in the tickets and/or analyze the one or more keywords based at least in part on one or more predetermined rules and/or analysis (e.g., weight/age based analysis and/or forensic analysis). In other exemplary embodiments, the system and method may identify a geographical location associated with the tickets and/or analyze one or more issues associated with the geographical location. In another exemplary embodiment, the system and method may automatically display the data collected from the tickets to a user via a user interface (e.g., an alert message). In addition, the data may be displayed to a user via the user interface in response to comments received from a user. The displayed data may assist the user in real-time troubleshooting and/or post-event forensic analysis. In other exemplary embodiments, the system and method may generate one or more reports to inform a user of one or more issues associated with a service. Furthermore, the system and method may generate an alert banner and/or transmit the alert banner to the user to provide warnings of abnormal activity and/or instability identified by the tickets.

The description below describes tickets, servers, computers, terminals, client devices, and other computing devices that may include one or more modules, some of which are explicitly depicted, others of which are not. As used herein, the term "module" may be understood to refer to executable software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, computers, etc.) separately. The functions described as being performed at various components may be performed at other components, and the various components may be combined and/or separated. Other modifications also may be made.

FIG. 1 illustrates a block diagram of an exemplary system 100 for monitoring and analyzing one or more tickets in accordance with an exemplary embodiment. The system 100 may monitor and/or analyze one or more tickets. In an exemplary embodiment, tickets may be submitted by customers, who are experiencing issues associated with a service (e.g., television services, Internet services, and/or telephone services) and/or equipment (e.g., wiring, set-up box, router, modem, television, and/or telephone) associated with a service. For example, the customers may experience issues associated with dropped wireless telephone calls, missing television channels, and/or lost of Internet connection. The customers may submit one or more tickets to a service provider to explain and/or resolve the issues. In an exemplary embodiment, the system 100 may include one or more inputs 110 (e.g., customer representatives, a telephone system, and/or an Internet server) that the users may use to submit the tickets. Also, the system 100 may include one or more user devices 102 which may interact with the one or more inputs 110 via a monitoring module 104 and/or an internal data network 106. The user may be associated with, but is not limited to, service providers, enterprises, educational institutions, government agencies, and any individual, group and/or organization running, maintaining and/or monitoring a network. Users within an organization may include, but are not limited to, network architects, network managers, engineers, planners, Network Operations Center (NOC) personnel, marketing, sales engineering, operations personnel, and customer support organizations. The user may monitor one or more parameters/keywords associated with the tickets submitted by user and generated by the one or more inputs 110. A relationship between various issues associated with the services and/or equipment and one or more parameters/keywords identified in the tickets may be established. For example, a power outage associated with the services and/or equipment may be related to thunderstorm and winds identified in the tickets. For example, the various parameters/keywords may include, but not limited to, a user name, account information, equipment, services, user's guides, geographical location, weather condition, troubleshooting, and/or other parameters a user may be interested to analyze/monitor. Also, one or more issues associated with services and/or equipment may include, but not limited to, issues associated with network elements and/or questions associated with television services features, Internet services features, telephone services features, installation, billing, and/or other issues a customer may experience.

The one or more user devices 102 may be a computer, a personal computer, a laptop, a cellular communication device, a global positioning system (GPS), a workstation, a mobile device, a phone, a handheld PC, a personal digital assistant (PDA), a thin system, a fat system, a network appliance, an Internet browser, a paging, an alert device, a television, an interactive television, a receiver, a tuner, a high definition (HD) television, a HD receiver, a video-on-demand (VOD) system, and/or other any other device that may allow a user to communicate with the monitoring module 104 via one or more networks (not shown) as known in the art.

A monitoring module 104 may be one or more servers. The monitoring module 104 may include a SQL Server, UNIX based servers, Windows 2000 Server, Microsoft IIS server, Apache HTTP server, API server, Java sever, Java Servlet API server, ASP server, PHP server, HTTP server, Mac OS X server, Oracle server, IP server, and/or other independent server to monitor and/or analyze the tickets generated by the one or more inputs 110. Also, the monitoring module 104 may store and/or run a variety of software, for example, Microsoft NET framework.

The internal data network 106 may be coupled to the one or more inputs 110 via a management Ethernet port (not shown). The internal data network 106 may be a wireless network, a wired network or any combination of wireless network and wired network. For example, the internal data network 106 may include, without limitation, Internet network, satellite network (e.g., operating in Band C, Band Ku and/or Band Ka), wireless LAN, Global System for Mobile Communication (GSM), Personal Communication Service (PCS), Personal Area Network (PAN), D-AMPS, Wi-Fi, Fixed Wireless Data, satellite network, IEEE 802.11a, 802.11b, 802.15.1, 802.11n and 802.11g and/or any other wireless network for transmitting a signal. In addition, the internal data network 106 may include, without limitation, telephone line, fiber optics, IEEE Ethernet 802.3, wide area network (WAN), local area network (LAN), global network such as the Internet. Also, the internal data network 106 may enable, an Internet network, a wireless communication network, a cellular network, an Intranet, or the like, or any combination thereof. The internal data network 106 may further include one, or any number of the exemplary types of networks mentioned above operating as a stand-alone network or in cooperation with each other.

A user associated with the one or more user devices 102 may interactively browse, monitor, and/or analyze tickets generated by the one or more inputs 110 to display various information associated with the tickets via the one or more user devices 102. For example, the one or more inputs 110 may include, but is not limited to, a customer representative, an automated telephonic service, an Internet website/webpage, a mail postal service, and/or other methods of communicating issues associated with services and/or equipment. Also, the one or more inputs 110 may include telephone systems and/or Internet servers. In an exemplary embodiment, the one or more inputs 110 may be a customer representative (e.g., a live person) and a customer may contact the customer representative via a telephone, a computer and/or in person. The customer representative may generate one or more tickets for the customer that is experiencing issues associated with services and/or equipment. In another exemplary embodiment, the one or more inputs 110 may be an automated telephone service, where a customer may dial into a telephone system to report issues associated with services and/or equipment. The telephone system may prompt the customer for response to one or more questions and generate one or more tickets based on the customer's response. In other exemplary embodiments, the one or more inputs 110 may be an Internet website/webpage hosted by an Internet server. For example, customers may access the website/webpage and report issues associated with services and/or equipment. In an additional exemplary embodiment, the one or more inputs 110 may be a mail postal service, where a customer may mail a letter and/or a ticket to a service provider to report issues associated with service and/or equipment. Also, the one or more inputs 110 may be located at various geographical locations (e.g., various cities, zip codes, states, and/or countries) for servicing users located at the various geographical locations. Further, one or more inputs 110 may be include one or more user input interface in order to allow the users to enter information associated with the issues of the services and/or the equipment.

Figure 2:
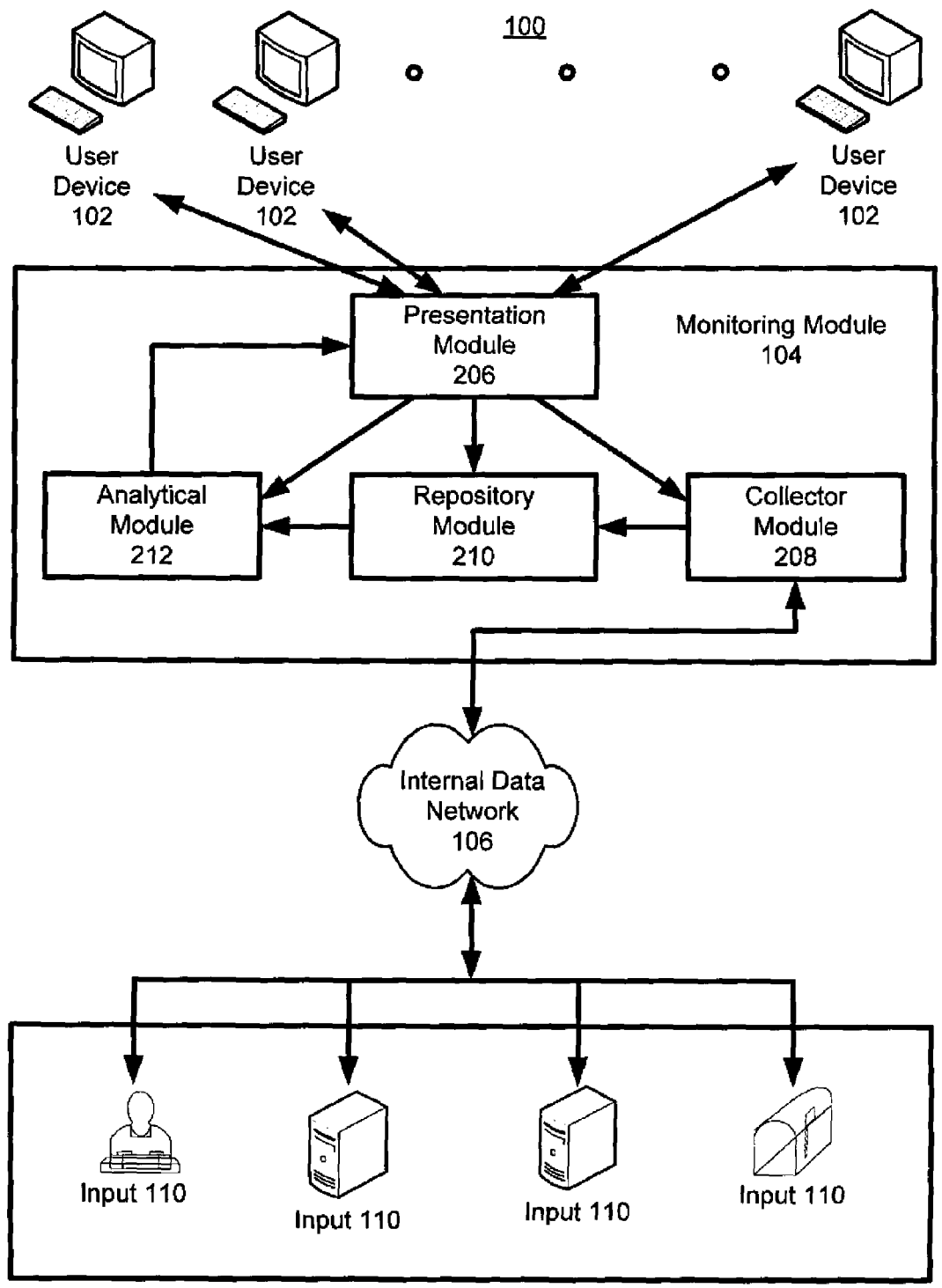
FIG. 2 illustrates a detailed block diagram of a system that may provide monitoring and/or analyzing one or more tickets in accordance with an exemplary embodiment.

FIG. 2 illustrates a detailed block diagram of exemplary system 100 for monitoring and/or analyzing of tickets in accordance with an exemplary embodiment. As shown in FIG. 2, the monitoring module 104 may include a collector module 208 which may collect data from the tickets generated by the one or more inputs 110 via the internal data network 106. The collector module 208 may preprocess the data collected from the tickets, e.g., filter, format, segregate, aggregate, etc. The preprocessing of the data provided by the collector module 208 may include filtering data and eliminate undesired data, formatting data into useful format, segregate data into categories based on parameters/keywords, and/or data aggregation where data is gathered and expressed in a summary form. The data may be transferred from the collector module 208 to a repository module 210. The repository module 210 may store and/or manage the data transferred from the collector module 208. An analytic module 212 may access the repository module 210 to obtain the data needed to perform one or more analyses, e.g., predetermined analysis. In addition, the data and/or the result of the one or more analyses may be automatically and/or upon a request by a user (e.g., a service administrator and/or manager), transferred to a presentation module 206 (e.g., an alert message) and presented to a user via the one or more user devices 102. The data and/or result of the one or more analyses may be transferred to the presentation module 206 and presented to a user via the one or more user devices 102 at a predetermined period of time.

The presentation module 206 may provide an interface between one or more user devices 102 and the monitoring module 104. The presentation module 206 may include a user interface, e.g., a graphical user interface, to receive requests from a user (e.g., a service administrator and/or manager) and to provide information and/or data to the user via the one or more user devices 102. The presentation module 206 may provide the data and/or the results of the one or more analyses to one or more users via a message, For example, the presentation module 206 may present the message via an alert and/or a report to the one or more user devices 102 in an electronic mail, a text message, a banner, a voice message, a letter and/or other communications means to present the message.

In addition, the presentation module 206 may include an Application Programming Interface (APT) to interact with the one or more user devices 102. In response to receiving a request from a user (e.g., a service administrator and/or manager) via the one or more user devices 102, the presentation module 206 may send requests (or control signals, etc.) to the collector module 208, the repository module 210, and/or the analytical module 212. In response to a request, the analytical module 212 may (a) receive data from repository module 210 and/or collector module 208, (b) analyze the data, and (c) provide data and/or analysis results to the presentation module 206. The presentation module 206 may provide the data and/or analysis results to the one or more user devices 102 for display. As a result, system 100 may allow the user to monitor and/or analyze tickets generated by the one or more inputs 110 in real-time and/or near real-time.

Moreover, the presentation module 206 may include an alert dispatcher module (not shown) for alerting one or more users (e.g., a service administrator and/or manager) in response to user-specified conditions. For example, a user may define a set of rules and/or conditions upon the occurrence of such rules and/or conditions, an alert message may be generated to alert the one or more users. Such alert message may include date, time, parameters/keywords, number of tickets associated with various issues associated with the services and/or equipment, one or more set of rules and/or conditions defined by a user, an analysis of data collected from the tickets generated by the one or more inputs 110 and/or information associated with the defined rules and/or conditions. For example, a user may be alerted in cases of achieving a predetermined count threshold or value, one or more count threshold-crossing events, instability in the operation of a network, failure of network element, network outage, data corruption, error in transferring data and/or other parameters requested by the user. In an exemplary embodiment, an alert may be automatically generated in the event that the number of tickets generated exceeds a count threshold associated with a parameter/keyword for a period of time. For example, a user may set a count threshold for tickets generated associated with one or more parameters/keywords for one or more issues associated with the services and/or the equipment for a period of time. In the event that the number of tickets generated associated with the one or more parameters/keywords for one or more issues associated with the services and/or the equipment exceeds the count threshold, an alert may be generated. In an exemplary embodiment, a user may set a count threshold to 500 tickets associated with missing channels for television services for a day. Therefore, in the event that the number of tickets generated in a day associated with the missing channels exceeds 500 tickets, a report may be automatically generated by the presentation module 206 and presented to the user via the one or more user devices 102. The dispatched alert can take various forms including, but not limited to, electronic mail, voice message, paging alert, text message and/or other communication means to alert the user.

Furthermore, the presentation module 206 may include a report generator module (not shown) for generating reports. For example, upon a user's (e.g., a service administrator and/or manager) request, a report may be generated periodically, e.g., hourly, daily, weekly, monthly, yearly, etc. The report may include date, time, number of tickets associated with various issues associated with the services and/or equipment, various parameters/keywords and/or analysis. Also, a report may be generated automatically when a user is logged into the system 100 in order to update the user of data and/or analyses results since the last time the user was logged into the system 100. For example, an outage in the services and/or the equipment may occur during the previous day, a report may be generated automatically and/or upon a request by a user to inform the user of various parameters and/or a number of tickets generated associated with the outage in the services and/or the equipment. Thus, a user may be informed of concerns, issues, and/or repairs that may be needed associated with the outage of the services and/or the equipment.

The collector module 208 may interact with the one or more inputs 110. Through these interactions, various parameters/data associated with tickets generated by the one or more inputs 110 may be captured. For example, the collector module 208 may sequentially and/or simultaneously collect various parameters/data from tickets generated by the one or more inputs 110. The collector module 208 may use one or more methods to access the one or more inputs 110 via the internal data network 106. For example, the collector modules 208 may access the one or more inputs 110 via telephone, mail, Internet, telecommunication network (TELNET), command line interface (CLI), secure socket header (SSH), simple network management protocol (SNMP), File Transfer Protocol (FTP), Secure Shell (SSH), and/or other methods access and/or collecting data from the tickets generated by one or more inputs 110. The collector module 208 may provide the data collected from the tickets generated by the one or more inputs 110 to the repository module 210. This data may include, but is not limited to, account information, geographical information, date, time, number of tickets associated with various issues associated the services and/or equipment, various parameters/keywords associated with the tickets, one or more sets of rules and/or conditions specified by the user and/or other data associated with the tickets. The collector module 208 may preprocess the data collected from the tickets generated by the one or more inputs 110 before transferring the data to the repository module 210.

The repository module 210 may store and manage data from the collector module 208. The repository module 210 may provide an interface, e.g., a uniform interface, for other modules within the system 100 and may read, write, and search data in one or more repositories or databases. The repository module 210 may also perform other functions, such as, but not limited to, concurrent access, backup and archive functions. Also, due to limited amount of storing space the repository module 210 may compress, store, backup, archive, transfer and/or discard the data stored within after a period of time, e.g., a month. The repository module 210 may provide data to the analytical module 212. Also, the repository module 210 may include one or more databases to store one or more inputs from a user. For example, the inputs from the user may include keywords, sets of rules and/or conditions, thresholds or values, threshold-crossing events, search queries, and/or other inputs from the user.

The analytical module 212 may retrieve data from the repository module 210 and analyze such data. The analytical module 212 may be in communication with the presentation module 206, the collector module 208 and/or the repository module 210. The analytical module 212 may further include a plurality of sub-analytical modules to perform various types of data analysis. The analytical module 212 may perform various analyses, such as, but not limited to, counting analysis, geographical analysis, time series analysis, forensic analysis, and/or pattern matching analysis. For example, using the one or more user devices 102, a user may select various types of data analyses to be performed. For example, a user may select counting analysis where a number of tickets associated with a parameter/keyword may be counted. Also, a user may select geographical analysis where a number of tickets generated in a geographical location may be counted. The geographical analysis may also count a number of tickets associated with a parameter/keyword in a geographical location. Further, a user may select a time series data analysis where data collected at an earlier time may be compared with the current data. Moreover, a user may select forensic data analysis where a user may select to analyze the data collected in the past. In addition, a user may select pattern matching analysis where patterns associated with the data collected in the past may be matched with the current data. The analytic module 212 may summarize and aggregate data retrieved from the repository module 210 to provide a complete report of the tickets generated by the one or more inputs 110. In addition, analytic module 212 may transmit an alert/report message to the presentation module 206 to generate one or more alerts and/or reports to the user.

Also, the analytical module 212 may update data stored in the repository module 210. For example, the analytical module 212 may transmit a request to update the data (e.g., a count threshold associated with a parameter/keyword) stored in the repository module 210. The request may be based at least in part on one or more analyses performed by the analytical module 212 in a period of time and/or a count threshold associated with a parameter/keyword stored in the repository module 210. For example, the analytical module 212 may perform a counting analysis where a number of tickets associated with a parameter/keyword may be counted. The count threshold may be adjusted based at least in part on whether tickets generated associated with a parameter/keyword exceeds a buffer amount and/or lower than the buffer amount. In an exemplary embodiment, in the event that the number of tickets generated that are associated with the parameter/keyword exceeds the count threshold stored in the repository module 210, the analytical module 212 may transmit a request to the repository module 210 to raise the count threshold. In another exemplary embodiment, the analytical module 212 may transmit a request to the repository module 210 to raise a count threshold associated with a parameter/keyword, in the event that the number of tickets generated that are associated with the parameter/keyword exceeds the count threshold by a buffer amount (e.g., a number of tickets). Also, the analytical module 212 may transmit a request to the repository module 210 to lower a count threshold associated with a parameter/keyword, in the event that the number of tickets generated with the parameter/keyword is lower than the count threshold by the buffer amount. The buffer amount may be based at least in part on a calculation (e.g., an average of the difference between the count threshold and the number of tickets counted for a week) performed by the analytical module 212 and/or an input by the user. In an additional exemplary embodiment, the analytical module 212 may transmit a request to the repository module 210 to raise a count threshold associated with a parameter/keyword, in the event that the number of tickets generated associated with the parameter/keyword exceeds the count threshold for a buffer time period (e.g., a number of days, weeks, months, and years). Also, the analytical module 212 may transmit a request to the repository module 210 to lower a count threshold associated with a parameter/keyword, in the event that the number of tickets generated associated with the parameter/keyword is lower than the count threshold for the buffer time period. The buffer time period may be determined by the analytical module 212 and/or an input by the user. In addition, analytic module 212 may transmit an alert/report message to the presentation module 206 to generate one or more alerts and/or reports to inform the user of the count threshold update.

In another exemplary embodiment, the analytical module 212 may transmit a request to update data (e.g., one or more parameters/keywords) stored in the repository module 210. The request may be based at least in part on one or more analyses performed by the analytical module 212 in a period of time. For example, the analytical module 212 may perform a counting analysis where a number of tickets associated with the parameter/keyword may be counted. In an exemplary embodiment, in the event that the number of tickets generated associated with a parameter/keyword is less than the count threshold stored in the repository module 210, the analytical module 212 may transmit a request to the repository module 210 to delete the parameter/keyword. In another exemplary embodiment, the analytical module 212 may transmit a request to the repository module 210 increase a weight percentage (e.g., importance to the services and/or the equipment) of a parameter/keyword, in the event that the number of tickets generated associated with the parameter/keyword exceeds the count threshold by a buffer amount (e.g., a number of tickets). Also, the analytical module 212 may transmit a request to the repository module 210 to delete a parameter/keyword, in the event that the number of tickets generated associated with the parameter/keyword is lower than the count threshold by the buffer amount. The buffer amount may be based at least in part on a calculation (e.g., an average of the difference between the count threshold and the number of tickets counted) performed by the analytical module 212 and/or an input by the user. In an additional exemplary embodiment, the analytical module 212 may transmit a request to the repository module 210 to increase a weight percentage associated with a parameter/keyword, in the event that the number of tickets generated associated with the parameter/keyword exceeds the count threshold for a buffer time period (e.g., a number of days, weeks, months, and years). Also, the analytical module 212 may transmit a request to the repository module 210 to delete a parameter/keyword, in the event that the number of tickets generated associated with the parameter/keyword is lower than the count threshold for the buffer time period. The buffer time period may be determined by the analytical module 212 and/or an input by the user. In other exemplary embodiment, the analytical module 212 may transmit a request to the repository module 210 to add a parameter/keyword, in the event that the number of tickets generated associated with the parameter/keyword exceeds an adding threshold. For example, the adding threshold may be a number of tickets required to add a parameter/keyword and may be determined by the analytical module 212 and/or an input by the user. In addition, analytic module 212 may transmit an alert/report message to the presentation module 206 to generate one or more alerts and/or reports to inform the user of the updated parameters/keywords.

Figure 3:
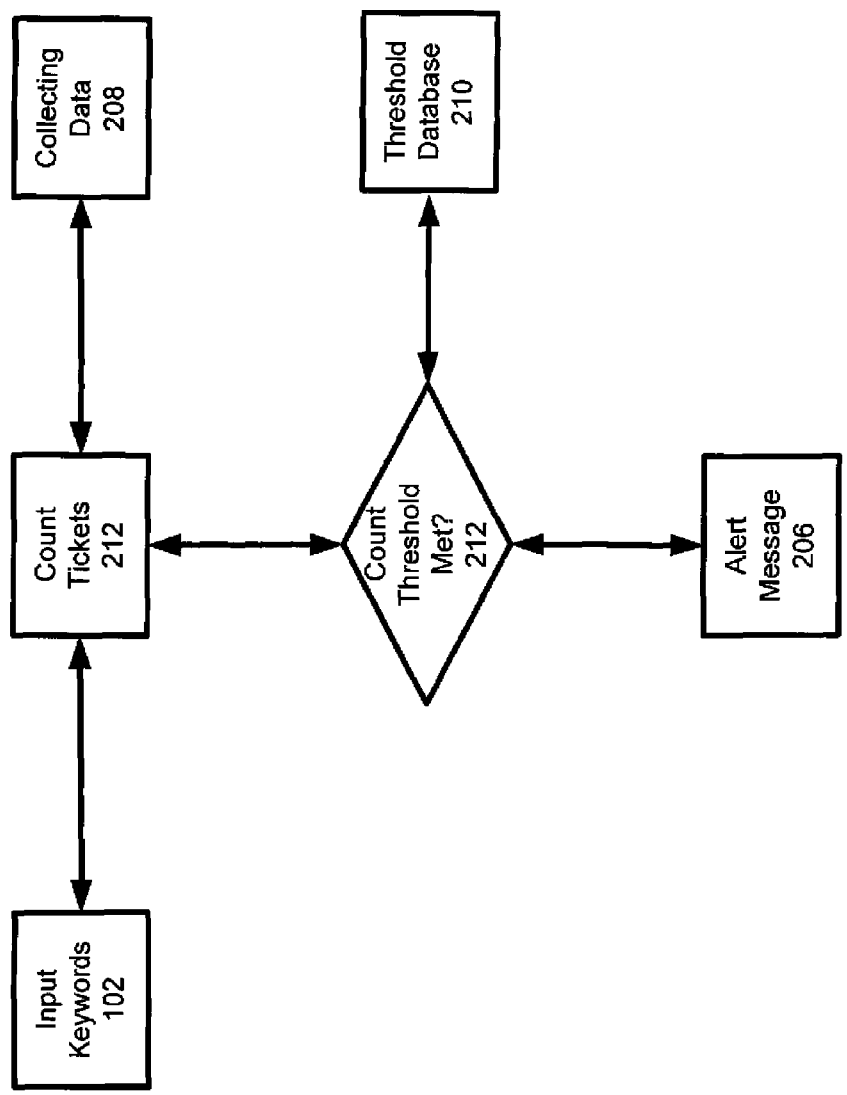
FIG. 3 illustrates a system flow diagram of a method for monitoring and/or analyzing one or more tickets in accordance with an exemplary embodiment.

FIG. 3 illustrates a system flow diagram to provide monitoring and/or analyzing one or more tickets in accordance with an exemplary embodiment. The flow diagram 300 shown in FIG. 3 can be executed or otherwise performed by one or a combination of various systems. The flow diagram 300 described below may be carried out by system 100 shown in FIGS. 1 and 2 by way of example, and various elements of the system 100 are referenced in explaining the example flow diagram of FIG. 3. For example, by monitoring and/or analyzing the tickets a service provider may monitor one or more issues associated with services and/or equipment. Also, by monitoring and/or analyzing the tickets the service provider may determine whether the issues associated with the services and/or the equipment have been fixed.

For example, one or more parameters/keywords may be inputted by a user via the one or more user devices 102. The one or more user devices 102 may communicate the one or more parameters/keywords to the analytical module 212 via the presentation module 206. The analytical module 212 may retrieve the ticket data retrieved from the repository module 210 and count a number of tickets associated with the one or more parameters/keywords inputted by the user. This may allow the user to focus on only the tickets associated with the one or more parameters/keywords inputted by the user. Also, the one or more parameters/keywords may be associated with one or more issues associated the services and/or the equipment. Therefore, by focusing on the one or more parameters/keywords may allow the user to determine whether the one or more issues associated with the services and/or the equipment is resolved. For example, one or more issues associated with the services and/or the equipment may be reported by one or more tickets and a service provider may try to resolve the one or more issues. In order to determine whether the one or more issues have been resolved, the service provider may input one or more parameters/keywords associated with the one or more issues into the system 100. The system 100 may monitor and/or analyze whether the tickets associated with the one or more issues are still being generated. In the event that the tickets associated with the one or more issues are no longer being generated, the service provider may conclude that the one or more issues have been fixed. However, in the event that the tickets associated with the one or more issues are still being generated, the service provider may conclude that the one or more issues have not been resolved. In an exemplary embodiment, a weather condition may cause one or more issues associated with services and/or equipment. A user may input one or more parameters/keywords associated with a weather condition to the monitoring module 104 via the one or more user devices 102. For example, the one or more parameters/keywords associated with a weather condition, may include lighting, thunder, tornado, power outage, voltage fluctuation and/or other parameters/keywords associated with severe weather. The monitoring module 104 may count the number of tickets associated with the one or more parameters/keywords. The monitoring module 104 may determine that the number of tickets generated associated with the one or more parameters/keywords exceeds the count threshold associated with the one or more parameters/keywords. Therefore, the service provider may determine that the weather condition may cause the one or more issues associated with the services and/or the equipment.

Also, the monitoring module 104 may determine the difference between the tickets generated associated with one or more parameters/keywords and the count threshold. Therefore, the service provider may determine a severity of the issues associated with the services and/or the equipment based on the difference between the tickets generated associated with the one or more parameters/keywords and the count threshold. For example, a count threshold for thunderstorm and/or wind is set for 500 tickets. During a first time period, the monitoring module 104 may determine that 700 tickets are generated associated with thunderstorm and/or wind and therefore 200 tickets exceeded the count threshold. During a second time period, the monitoring module 104 may determine that 1,000 tickets are generated associated with thunderstorm and/or wind and therefore 500 tickets exceeded the count threshold. Therefore, the service provider may determine that during the second time period the issues associated with the services and/or the equipment is more severe than during the first time period.

In addition, the monitoring module 104 may determine a geographical location of the tickets generated associated with the one or more parameters/keywords. Therefore, the service provider may determine whether a geographical location is having a weather condition and the weather condition is causing the one or more issues associated with the services and/or the equipment. For example, the monitoring module 104 may determine that 1,000 tickets are generated associated with thunderstorm and/or wind. Also, the monitoring module 104 may determine that the input 110 located at a Dallas, Tex. generated 300 out of the 1,000 tickets generated associated with the thunderstorm and/or wind. The monitoring module 104 may also determine that the input 110 located at Portland, Wash. generated 700 out of the 1,000 tickets generated associated with the thunderstorm and/or wind. Thus, the service provider may determine that Portland, Wash. is more affected by the one or more issues associated with the thunderstorm and/or wind than Dallas, Tex.

In another exemplary embodiment, the monitoring module 104 may determine a total number of tickets generated associated with a plurality of parameters/keywords in a period of time. The monitoring module 104 may determine a weight percentage (e.g., priority) for each of the plurality of the parameters/keywords based on the number of tickets associated with each of the plurality of the parameters/keywords. For example, the monitoring module 104 may determine that 1,000 tickets are generated in one day associated with missing channel, power outage, and voltage fluctuation. The monitoring module 104 may determine that 200 out of the 1,000 tickets (e.g., 20%) are associated with power outage, 300 out of the 1,000 tickets (e.g., 30%) are associated with voltage fluctuation, and 500 out of the 1,000 tickets (50%) are associated with missing channel. Thus, the monitoring module 104 may determine a priority of the plurality of the parameters/keywords based on the weight percentage of the tickets generated associated with each of the plurality of the parameters/keywords. For example, the monitoring module 104 may determine that missing channel (50%) has a high priority, voltage fluctuation (30%) has a medium priority, and power outage (20%) has a low priority.

In other exemplary embodiments, tickets generated by the one or more inputs 110 may be collected by the collector module 208 of the monitoring module 104. The collector module 208 may pre-process data associated with the tickets. The analytical module 212 of the monitoring module 104 may count the number of the tickets associated with one or more parameters/keywords. The analytical module 212 may access the repository module 210 to obtain a count threshold associated with the one or more parameters/keywords and/or a buffer amount associated with the one or more parameters/keywords. The monitoring module 104 may identify one or more parameters/keywords having tickets exceed the count threshold and the buffer amount associated with the one or more parameters/keywords. For example, count threshold for dropped-calls may be set at 500, count threshold for set-up box may be set at 600, and count threshold for routers may be set at 400. The buffer amount associated with dropped-call, set-up box, and/or count threshold may be the same or different. For example, the buffer amount for dropped-calls may be set at 100, set-up box may be set at 120, and routers may be set at 80. In the event that tickets generated associated with dropped-calls is at 1,000, set-up box is at 700, and routers is at 500, the monitoring module 104 may identify one or more parameters/keywords that exceeded the buffer amount. The monitoring module 104 may identify that dropped-calls and routers have tickets generated exceeded the buffer amount, therefore, the monitoring module 104 may determine that the dropped-calls and the routers may be important for the service provider to review. Moreover, the monitoring module 104 may determine which of the dropped-calls and the routers has a higher priority based on a deviation from the count threshold. The deviation from the count threshold for dropped-calls is 500 tickets (e.g., deviation percent of 100%) and for routers is 100 (e.g., deviation percent of 25%), therefore the monitoring module 104 may determine that the dropped-calls has a higher priority than the routers. After the analyses conducted by the monitoring module 104, as described above, the presentation module 206 may generate an alert message/report and provided to the service provider via the one or more user devices 102.

Figure 4:
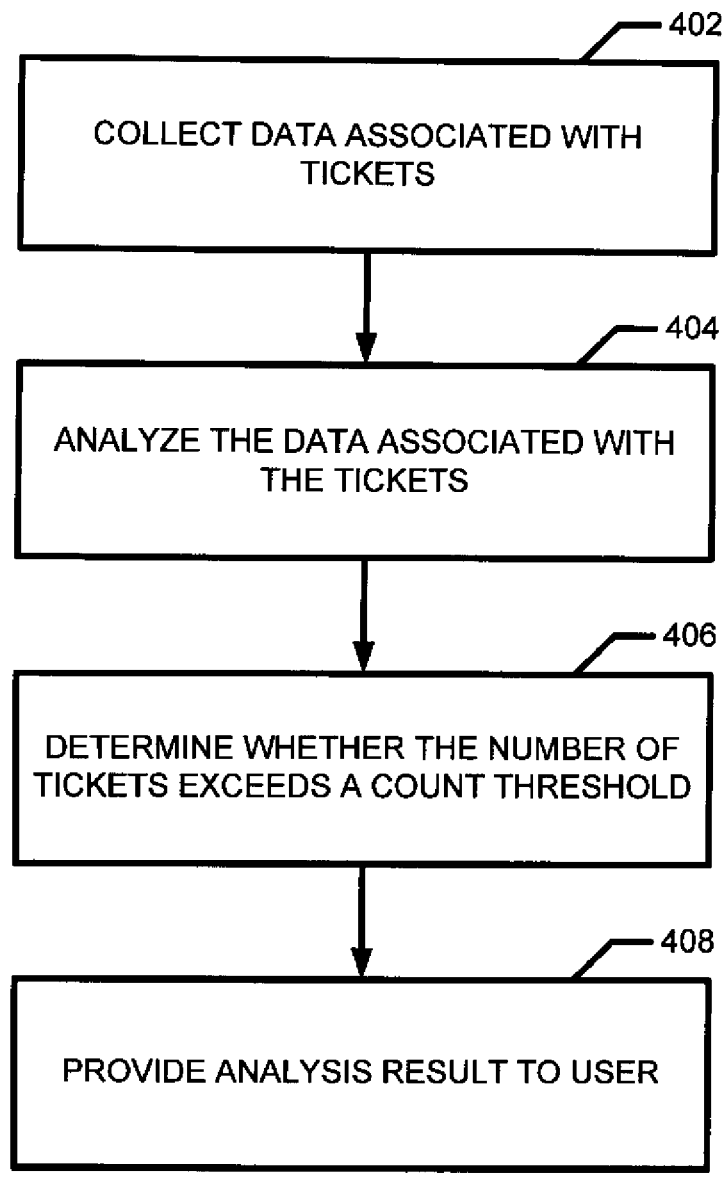
FIG. 4 illustrates a flow diagram of a method for monitoring and/or analyzing one or more tickets in accordance with an exemplary embodiment.

FIG. 4 illustrates a flow diagram of a method for monitoring and/or analysis of tickets in accordance with exemplary embodiments. This exemplary method 400 is provided by way of example, as there are a variety of ways to carry out methods according to the present disclosure. The method 400 shown in FIG. 4 can be executed or otherwise performed by one or a combination of various systems. The method 400 described below may be carried out by system 100 shown in FIGS. 1 and 2 by way of example, and various elements of the system 100 are referenced in explaining the example method of FIG. 4. Each block shown in FIG. 4 represents one or more processes, methods or subroutines carried in exemplary method 400. Referring to FIG. 4, exemplary method 400 may begin at block 402.

At block 402, data associated with tickets may be collected. For example, the collector module 208 may collect the data associated with the tickets. The collector module 208 may access the one or more inputs 110 by transmitting one or more access request signals over an internal data network 106. The collector module 208 may collect data associated with one or more parameters/keywords of the tickets generated by the one or more inputs 110. Also, the collector module 208 may collect data associated with one or more parameters/keywords inputted by a user of the tickets generated by the one or more inputs 110. Thereafter, the collector module 208 may transfer the collected data associated with the one or more parameters/keywords of the tickets generated by the one or more inputs 110 to a repository module 210. The repository module 110 may also perform other functions, such as, but not limited to, count thresholds, parameters/keywords, buffer amount/time period, concurrent access, backup and archive functions. After the collector module 208 may collect data associated with the tickets, the method 400 may proceed to block 404.

At block 404, the data collected may be analyzed. For example, the analytical module 212 may analyze the data collected by the collector module 208. The analytical module 212 may retrieve the data associated with one or more parameters/keywords of the tickets from the repository module 210. The analytical module 212 may count the number of tickets associated with the one or more parameters/keywords. Also, the analytical module 212 may count the number of tickets associated with the one or more parameters/keywords in real-time (e.g., as rapidly as required, actual time) or about real-time. Also, the analytical module 212 may categorize the tickets based on the one or more parameters/keywords. In addition, the analytical module 212 may access the repository module 210 to obtain a count threshold associated with the one or more parameters/keywords. Moreover, the analytical module 212 may analyze the data associated with one or more parameters/keywords based on a geographical location. After the analytical module 212 may analyze the data collected by the collector module 208, the method 400 may proceed to block 406.

At block 406, whether the number of tickets associated with the one or more parameters/keywords exceeds a count threshold associated with the one or more parameters/keywords may be determined. For example, the analytical module 212 may determine whether the number of tickets associated with the one or more parameters/keywords exceeds the count threshold associated with the one or more parameters/keywords. For example, the analytical module 212 may compare the number of tickets associated with the one or more parameters/keywords with the count threshold associated with the one or more parameters/keywords. After the analytical module 212 may determine whether the number of tickets associated with the one or more parameters/keywords exceeds the count threshold associated with the one or more parameters/keywords, the method may proceed to block 408.

At block 408, an analysis result may be provided to a user. For example, the analytical module 212 may send an alert message/report to the one or more user devices 102 via a presentation module 206. Also, in the event that the number of tickets associated with the one or more parameters/keywords exceeds the count threshold, the analytical module 212 may generate the alert message/report to the one or more user devices 102 via the presentation module 206.

In the preceding specification, various preferred embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

What is claimed:

1. A system comprising:
    a collector module configured to collect data associated with one or more parameters of tickets, wherein the one or more parameters are generated by one or more inputs;
    an analytical module, comprising a processor, configured to:
        count a number of the tickets associated with the one or more parameters based at least in part on the collected data;
        determine whether the number of tickets associated with the one or more parameters exceeds a count threshold by a buffer amount;
        determine a priority associated with the one or more parameters based on a difference between the number of tickets associated with the one or more parameters and the count threshold; and
        determine a weight percentage for each of the one or more parameters based on the number of tickets associated with each of the one or more parameters; and
    a presentation module, comprising an electronic graphical user interface, configured to output a result of the analysis of the collected data, by the analytical module,
    wherein the buffer amount is based on a calculation of an average of the difference between the count threshold and the number of tickets associated with the one or more parameters counted over a particular time period.

2. The system of claim 1, wherein the tickets are generated by one or more inputs.

3. The system of claim 2, wherein the collector module is further configured to access the one or more inputs to collect the data associated with the one or more parameters of the tickets.

4. The system of claim 2, wherein the one or more inputs comprises at least one of a customer representative, an automated telephonic service, an Internet webpage, and a mail postal service.

5. The system of claim 2, wherein the one or more inputs are located at various geographical locations.

6. The system of claim 1, wherein the analytical module is configured to determine whether the number of tickets associated with the one or more parameters exceeds the count threshold by the buffer amount for a predetermined buffer time period.

7. The system of claim 1, wherein the analytical module is further configured to perform at least one of pattern matching analysis, time series analysis and forensic analysis based at least in part on the collected data.

8. The system of claim 1, wherein the analytical module is further configured to alert a user based at least in part on a determination that the number of tickets associated with the one or more parameters exceeds the count threshold by the buffer amount.

9. The system of claim 1, wherein the analytical module is further configured to determine a number of tickets associated with the one or more parameters generated at one or more geographical locations.

10. The system of claim 1, further comprising a repository module configured to store at least one of the collected data, the one or more parameters, and the count threshold associated with the one or more parameters.

11. The system of claim 1, wherein the analytical module is further configured to update the count threshold associated with the one or more parameters responsive to the count threshold.

12. The system of claim 1, wherein the analytical module is further configured to alert one or more users in response to one or more user specified conditions.

13. A method, comprising:
    collecting data associated with one or more parameters of tickets, wherein the one or more parameters are generated by one or more inputs;
    analyzing the collected data, including:
        counting a number of tickets associated the one or more parameters;
        determining whether the number of tickets associated with the one or more parameters exceeds a count threshold by a buffer amount;
        determining a priority associated with the one or more parameters based on a difference between the number of tickets associated with the one or more parameters and the count threshold; and
        determining a weight percentage for each of the one or more parameters based on the number of tickets associated with each of the one or more parameters; and
    outputting, via an electronic graphical user interface, a result of the analysis of the collected data,
    wherein the buffer amount is based on a calculation of an average of the difference between the count threshold and the number of tickets associated with the one or more parameters counted over a particular time period.

14. The method of claim 13, wherein analyzing the collected data comprises determining whether the number of tickets associated with the one or more parameters exceeds the count threshold by the buffer amount for a predetermined buffer time period.

15. The method of claim 14, further comprises alerting a user based at least in part on a determination that the number of tickets associated with the one or more parameters is greater than the count threshold.

16. The method of claim 13, wherein the tickets are generated by one or more inputs located at one or more geographical locations to monitor one or more issues at the one or more geographical locations.

17. The method of claim 13, further comprises performing at least one of segregating, filtering, formatting and aggregating the collected data.

18. The method of claim 13, wherein analyzing the collected data further comprises performing at least one of pattern matching analysis, time series analysis and forensic analysis based at least in part on the collected data.

19. The method of claim 13, wherein analyzing the collected data further comprises alerting one or more users in response to one or more user specified conditions.

20. The method of claim 13, wherein analyzing the collected data further comprises determining a number of tickets associated with the one or more parameters generated in a geographical location.

21. The method of claim 13, further comprises storing at least one of the collected data, the one or more parameters, and the count threshold associated with the one or more parameters in a repository module.

22. The method of claim 13, further comprises updating the count threshold associated with the one or more parameters responsive to the count threshold.

23. A non-transitory computer readable media comprising code to perform the acts of:
    collecting data associated with one or more parameters of tickets, wherein the one or more parameters are generated by one or more inputs;
    analyzing the collected data, including:
        counting a number of tickets associated the one or more parameters;
        determining whether the number of tickets associated with the one or more parameters exceeds a count threshold by a buffer amount;
        determining a priority associated with the one or more parameters based on a difference between the number of tickets associated with the one or more parameters and the count threshold; and
        determining a weight percentage for each of the one or more parameters based on the number of tickets associated with each of the one or more parameters; and
    outputting, via an electronic graphical user interface, a result of the analysis of the collected data,
    wherein the buffer amount is based on a calculation of an average of the difference between the count threshold and the number of tickets associated with the one or more parameters counted over a particular time period.

* * * * *